(12) United States Patent
Katoh et al.

(10) Patent No.: US 7,233,667 B1
(45) Date of Patent: Jun. 19, 2007

(54) RECORD MEDIUM, RECORD MEDIUM MANUFACTURING DEVICE, COMPUTER READABLE RECORD MEDIUM ON WHICH PROGRAM IS RECORDED, AND DATA PRESENTATION DEVICE

(75) Inventors: Taku Katoh, Kamakura (JP); Naoki Endoh, Tokyo (JP); Koichi Hirayama, Yokohama (JP); Hisashi Yamada, Yokohama (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 0 days.

(21) Appl. No.: 09/267,639

(22) Filed: Mar. 15, 1999

(30) Foreign Application Priority Data

Mar. 17, 1998 (JP) .................................. 10-066665
Mar. 3, 1999 (JP) .................................. 11-054855

(51) Int. Cl.
*H04L 1/00* (2006.01)
(52) U.S. Cl. ...................... 380/201; 380/239; 380/240; 705/57; 369/30.22; 369/47.12; 369/47.13

(58) Field of Classification Search ................ 380/201, 380/239, 240; 705/57; 369/30.22, 47.12, 369/47.13; 726/30, 31, 32
See application file for complete search history.

(56) References Cited

U.S. PATENT DOCUMENTS

| 5,065,429 | A | * | 11/1991 | Lang | ............................ 705/56 |
| 5,418,852 | A | | 5/1995 | Itami et al. | ..................... 380/4 |
| 6,289,102 | B1 | * | 9/2001 | Ueda et al. | ................. 380/201 |
| 6,320,829 | B1 | * | 11/2001 | Matsumoto et al. | ..... 369/47.12 |
| 6,792,538 | B1 | * | 9/2004 | Kuroda et al. | .............. 713/193 |

FOREIGN PATENT DOCUMENTS

| EP | 0 794 496 A1 | 9/1997 |
| EP | 0 908 881 A2 | 4/1999 |
| JP | 09-128890 | 5/1997 |

* cited by examiner

*Primary Examiner*—Emmanuel L. Moise
*Assistant Examiner*—Paul Callahan
(74) *Attorney, Agent, or Firm*—Finnegan, Henderson, Farabow, Garrett & Dunner, L.L.P.

(57) ABSTRACT

A record medium comprises an original data obtained by superimposing a presentation target data, to which an error correction encoding is performed and an identification information.

3 Claims, 12 Drawing Sheets (a) ERROR OCCURRENCE IN DATA TRANSMISSION AND READING
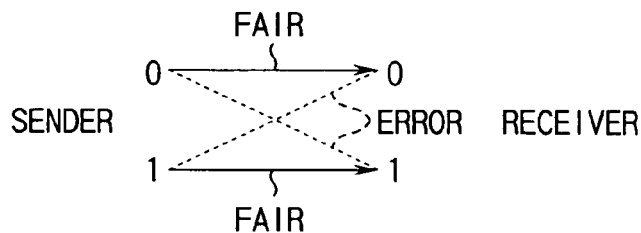
(b) IDEA OF ERROR CORRECTION (1)
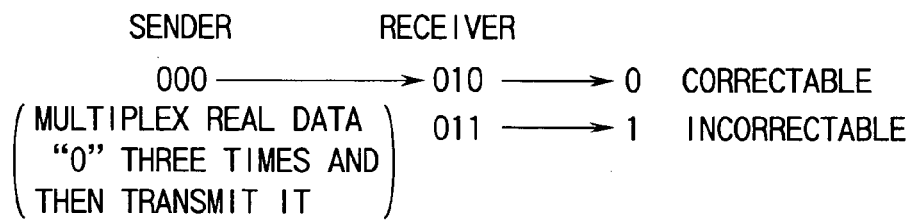
(c) IDEA OF ERROR CORRECTION (2)
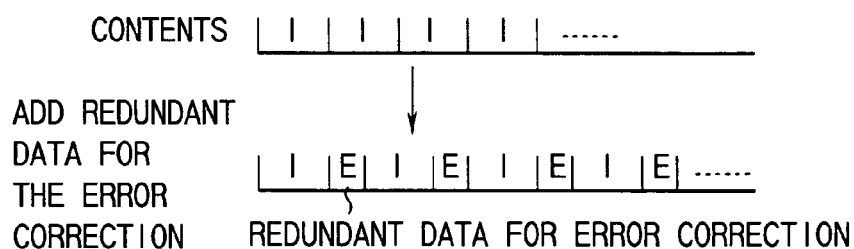
(d) SUBSTITUTION OF IDENTIFICATION INFORMATION
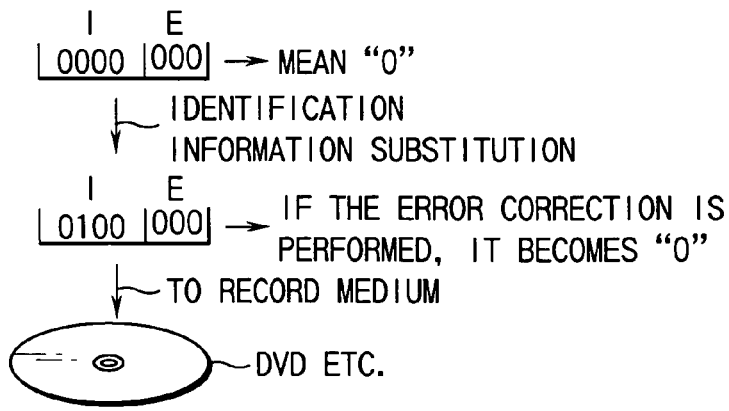
FIG. 2

FIG. 9

IDENTIFICATION INFORMATION DECODER (TABLE REFERENCE TYPE 1)

| INDEX {IDENTIFICATION INFORMATION SUPERIMPOSED POSITION SPECIFICATION INFORMATION} | PARTIAL IDENTIFICATION INFORMATION | | | | |
|---|---|---|---|---|---|
| | M1 | M2 | M3 | ... | Mn |
| T1 | (x11,y11) | (x12,y12) | (x13,y13) | ... | (x1n,y1n) |
| T2 | (x21,y21) | (x22,y22) | (x23,y23) | ... | (x1n,y1n) |
| ... | | | | | |
| Tm | (xm1,ym1) | (xm2,ym2) | (xm3,ym3) | ... | (xmn,ymn) |

⟵ 21

INDEX Ti {IDENTIFICATION INFORMATION SUPERIMPOSED POSITION SPECIFICATION INFORMATION} → [SUPERIMPOSED POSITION DECISION CIRCUIT (SEE TABLE 21)] 15b → SUPERIMPOSED POSITION INFORMATION ON EACH PARTIAL IDENTIFICATION INFORMATION

RECORD MEDIUM, RECORD MEDIUM MANUFACTURING DEVICE, COMPUTER READABLE RECORD MEDIUM ON WHICH PROGRAM IS RECORDED, AND DATA PRESENTATION DEVICE

BACKGROUND OF THE INVENTION

The present invention relates to a first record medium on which original data (there are two cases: when the term "original data" is used in the specification an original data which becomes record target to the record medium and an original data which becomes a presentation target from the record medium) is recorded, and a second record medium, which is distinguishable from the first record medium, on which data copied from the first record medium is recorded. This invention also relates to a record medium capable of preventing an unauthorized copy of the original data, a record medium manufacturing device, a computer readable record medium on which a program is recorded, and a data presentation device which presents the data on the record medium.

Various record media to store the digital data of the multimedia data have been developed in recent years. If data is copied from the digital record medium, a record medium on which the same data as the original data is copied is created. It is important to prevent an unauthorized copy to protect a copyright, and in addition, to develop a technology and a market which uses the medium which contains contents from the copyright holder.

For example, conventionally, in some digital record media such as a DAT (Digital Audio Tape) and MD (Mini Disc), a technology which can perform only once (first generation) digital copy is provided, in addition to a general medium in which copying is completely permitted (copy freely).

These technologies are called CGMS (Copy Generation Management System) and SCMS (Serial Copy Management System), and have a mechanism such that prevents copying (second generation) from the medium manufactured by copying from the medium to which only the first generation copy is permitted. As a result, an unauthorized copy cannot be manufactured.

In CGMS and SCMS, information as to whether it is a copied medium (Whether a copy of a next generation can be performed or not?) is shown by flag information in two bits.

However, in such CGMS and SCMS, it is comparatively easy to falsify this on the transmission line when the flag information is transmitted with the main body of contents. Therefore, there is a problem that an unauthorized copy may be performed by the falsification of the flag information. The medium to which it is copied without authorization is generally called a piracy edition, which can circulate.

BRIEF SUMMARY OF THE INVENTION

An object of the present invention is to provide a record medium, a record medium manufacturing device, a computer readable record medium on which a program is recorded in which it can be judged whether digital data recorded in the record medium is original data or copied data, and an unauthorized data copy can be prevented, and, in addition, a data presentation device which presents the record medium.

A record medium of the present invention comprises an original data obtained by superimposing a presentation target data, to which an error correction encoding is performed, with an identification information.

In the present invention, an original data in which a presentation target data and an identification information are superimposed is stored in the record medium. The identification information disappears by the error correction processing when the original data is taken out and is presented, and the presentation data becomes different data from the original data. That is, the identification information is forcibly embedded into the original data as an error data in the present invention. This superimposed identification information is of a frequency that will be surely removed by the error correction processing.

It can be judged whether or not the record medium stores the original data, if the identification information is taken out before the error correction processing is performed. Therefore, it can be judged whether the record medium in which the digital data is recorded is an original data or a copied data, and an unauthorized data copy can be prevented.

The preferred characteristics of the above-mentioned record medium are as follows.

(1) The identification information has a plurality of partial identification informations, and the plurality of partial identification informations are separately superimposed to a plurality of positions in the presentation target data to which the error correction encoding is performed. If identification information is made sufficiently long, the data reliability can be improved. In addition, safety can be improved since the identification information is distributedly embedded in the original data.

(2) The identification information is superimposed to a data part stored in an area where a control information of contents data in a record area is recorded. With this configuration, change of the identification information by the third party can be prevented after the record medium is manufactured.

(3) Information to acquire a superimposed position of the identification information is further provided. It makes taking out the identification information easy and certain.

(4) The identification information has a plurality of partial identification informations, including information to acquire the superimposed position of the identification information, which has initial value information, superimposed position information indicating the superimposed positions of the plurality of partial identification informations, and a plurality of position informations to acquire the position of the superimposed position information, a first position information to acquire the position of the superimposed position information is recorded at a position obtained by converting the initial value information by a predetermined function or a position shown by a position obtained as a result of the conversion, and a second or later position information is recorded in another position of the position obtained by converting a storage information of a position of a result when an information stored at another position of a side where the position information is not stored is further converted by the predetermined function in any positions obtained by a conversion result of the predetermined function, or a storage information at a position indicated to a position of a result of conversion one by one. Since such means is provided, a concealment of the position information and the superimposed position information can be improved besides the similar function and advantage to (3) is achieved.

(5) The identification information has a plurality of partial identification informations, including information to acquire a superimposed position of the identification information, which has an initial value information, superimposed position information indicating a superimposed position of the plurality of partial identification informations, and a plurality of position informations for acquiring a position of the superimposed position information, an initial position information is recorded at a position obtained by converting the initial value information by a predetermined function or a position shown by a position obtained as a result of conversion by the predetermined conversion formula, and a position information after that is recorded at a position based on a data recorded by a predetermined distance at a position indicated by a position information obtained immediately before or a distance obtained by a predetermined conversion formula, or a position obtained by converting a position information obtained immediately before by a predetermined conversion formula. Since such means is provided, a concealment of the position information and the superimposed position information can be improved besides the similar function and advantage to (3) is achieved.

(6) A superimposed position of the identification information is given by a table form. Since such means is provided, a concealment of the position information and the superimposed position information can be improved in addition to achieving functions and advantages similar to (3).

(7) The presentation target data is scrambled or encrypted using the identification information as a key, before an error correction encoding is performed. Since such means is provided, output data presentation cannot be performed if the scramble or the encryption cannot be released by taking out the identification information as a key when the presentation target data is presented. Thus, an unauthorized copying of the presentation target data can be prevented.

Of course, the present invention can be applied also to a record medium manufacturing device to manufacture the above-mentioned record medium and the undermentioned data presentation device which presents the data recorded in the record medium manufactured with the manufacturing device, for example.

The data presentation device of the present invention comprises an identification information decoding means to extract identification information from read information before the read original data from one of above-mentioned record media is error-corrected, and judgement means to judge whether or not data stored in the record medium is an original data based on the identification information extracted by the identification information decoding means and to output a judgement result. Since such means is provided, judgement as to whether or not data stored in the, record medium is an original record, and whether a record medium is an original record medium can be done, and the judgment result is output. If this judgment result is used, the prevention of an unauthorized copy and the generation management of data copy etc. can be easily performed.

Moreover, a data presentation device which presents the data recorded on the record media from (1) to (7) can be achieved as well as the above-mentioned. The same advantage as the above-mentioned record medium can be achieved according to such a data presentation device.

In addition, another embodiment is a record medium on which a control program is recorded to achieve the function of the above-mentioned record medium manufacturing device and the data presentation device on a computer, and, in that case, a similar advantage to the above-mentioned can be obtained. For example, the following record media can be achieved.

For example, a computer readable record medium on which a program for the computer to function is recorded, comprises a program which executes: error correction encoding means for encoding a presentation target data by error-correcting code; and identification information superimposed means for superimposing an identification information to the presentation target data that was error correction encoded by the error correction encoding means. Here, a program for scrambling or encrypting the presentation target data uses the identification information as a key, and means for delivering it to error correction encoding means is further provided.

Moreover, a computer readable record medium on which a program for the computer to function is recorded, comprises a program which executes: identification information decoding means for extracting an identification information from a read information before an original data read from the above-mentioned record medium is error-corrected; judgment means for judging whether a data stored in the record medium, based on an identification information extracted to the identification information decoding means, is an original data, and for outputting a judgment result. A computer readable record medium on which a program for the computer to function is recorded, comprises a program which executes: identification information decoding means for extracting an identification information from a read information before an original data read from the above-mentioned record medium is error-corrected; data presentation means for unscrambling or decrypting the presentation target data which is scrambled or decrypted in which an identification information extracted to the identification information decoding means is made as a key.

As described above in detail, according to the present invention, since the identification information is superimposed to the presentation target data which is error-correcting-coded and the result thereof is made to an original data, a record medium, a record medium manufacturing device, a data presentation device, and a computer readable record medium on which a program is recorded, in which it can be judged whether a digital data recorded in the record medium is an original data or a copied data, and an unauthorized data copy can be prevented.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a figure to explain an outline idea of the error correction;

FIG. 9 is a figure to explain the configuration of the information storage table and a method of acquiring superimposed position information of partial identification information according to the embodiment;

DETAILED DESCRIPTION OF THE INVENTION

Hereinafter, the embodiments of present invention will be explained.

First Embodiment

A method of embedding the identification information in the main body of data of the digital record medium by using the error correction technology in the first embodiment will be explained.

Figure 1:
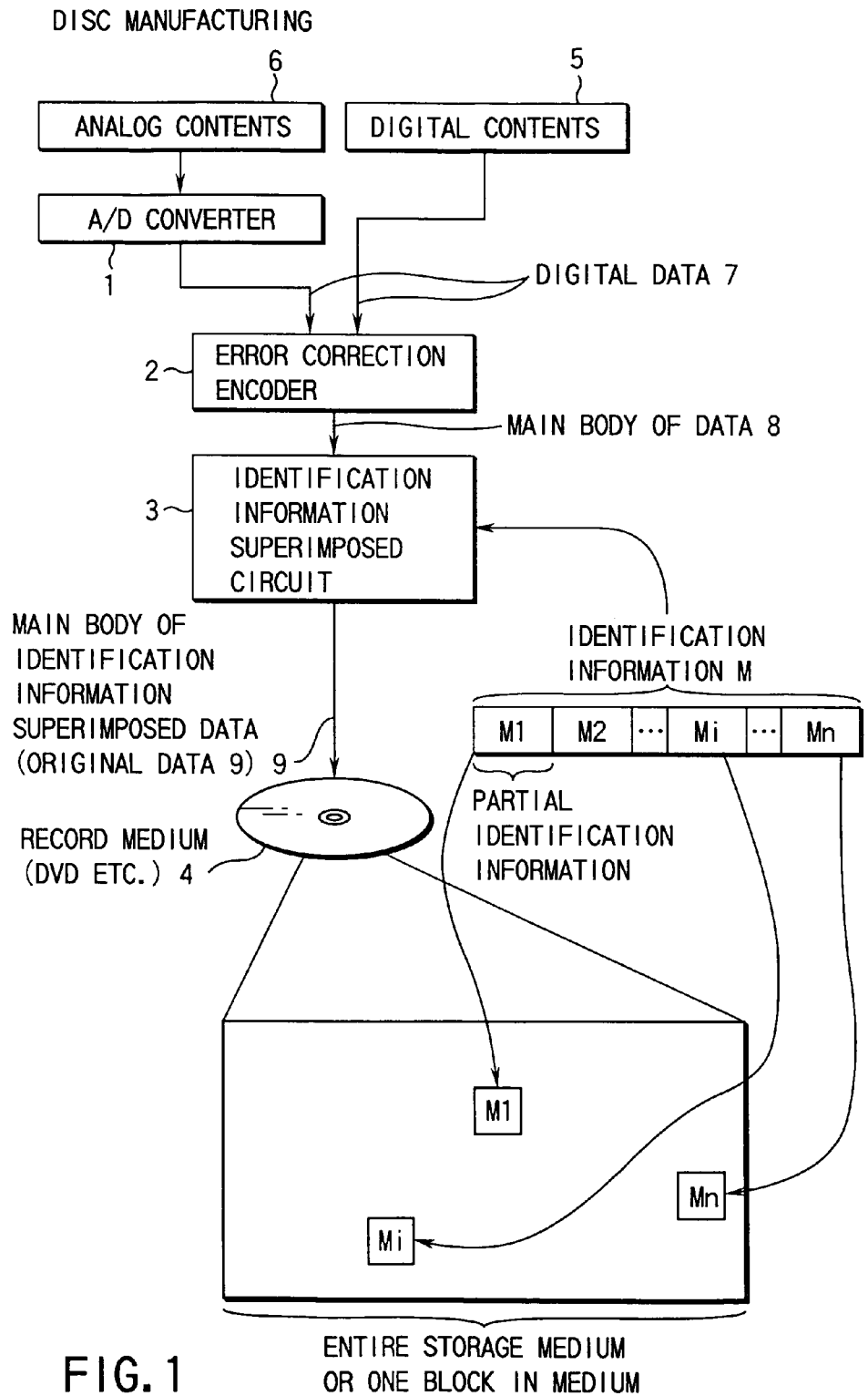
FIG. 1 is a block diagram which shows an example of a main configuration of the record medium manufacturing device according to the first embodiment of the present invention.

FIG. 1 is a block diagram which shows an example of a main configuration of the record medium manufacturing device according to the first embodiment of the present invention.

The record medium manufacturing device shown in FIG. 1 has an A/D converter 1, an error correction encoder 2, and an identification information superimposition circuit 3, and these circuits relate to the embedded part of the identification information in which the error correction technology is used. The explanation about a general configuration part which affects manufacturing the record medium will be omitted.

The record medium 4 manufactured here is a disc which is a readable and readable/recordable medium such as a DVD (Digital Video Disc, Digital Versatile Disc)-ROM, DVD-RAM, MD, CD, CD-ROM, and CD-R, etc., and an original record medium on which the multimedia data such as documents, audio, still pictures, and the motion images, etc. are recorded.

In the first embodiment, the original record medium 4 is manufactured such that the identification information M stored only in the original record medium disappears when the data taken out from the original record medium 4 is recorded on other record media.

As a component for that, first, the error correction encoder 2 takes the digital data 7, adds to its contents an error correction encoding, and generates the main body 8 of data stored in the record medium 4. The identification information superimposition circuit 3 embeds the identification information M in a part of the main body 8 of data, and outputs the corresponding superimposed data 9 to the record medium 4.

Next, operation of a record medium manufacturing device as mentioned above, constructed according to the first embodiment will be explained.

First, the digital contents 5 and the analog contents 6 of the multimedia data to be recorded on the original record medium 4 are prepared. In the case of analog data, first, a sampling and a quantization are performed in the A/D converter 1 and the data is converted into digital data 7.

An appropriate error correction encoding is performed to the digital data 7 which consists of the digital contents 5 and the analog contents 6 on which the A/D conversion was performed by the error correction encoder 2 to correct any error occurring in the transmission line, and the main body 8 of data is obtained.

Next, the identification information superimposition circuit 3 superimposes the identification information M onto a part of the digital data (main body 8 of data) on which an error correction encoding is performed. When it is expected the error is embedded to the identification information M, the identification information to be added is made an error correction encoding beforehand. As a result, the identification information is divided into an appropriate size (byte unit etc.) when it becomes long, and is made as partial identification informations MI, M2, . . . , Mi, . . . , Mn, respectively. The identification information M shown in FIG. 1 is the information to which an error correction encoding is performed beforehand like this.

The main body 9 of the identification information superimposed data obtained thus is stored in the record medium 4 as original data, and the disc manufacturing is completed.

Therefore, the identification information M (partial identification informations MI, . . . , Mn) is embedded into a part of the digital data (main body 8 of data) to which an error correction encoding is performed as shown in FIG. 1 either in a predetermined position in all data in the record medium 4 or in the data for every data block with constant size. Each of the partial identification information Mi is distributed in the data block and is embedded as shown in FIG. 1. The data into which the identification information M is embedded is the original data of the record medium 4.

A method of taking out the digital data 7 which is the contents of the record medium 4 manufactured like this, and a method of taking out the identification information M and preventing unauthorized copying of the original data will be explained next.

FIG. 2 is a figure to explain an outline idea of the error correction.

Figure 3:
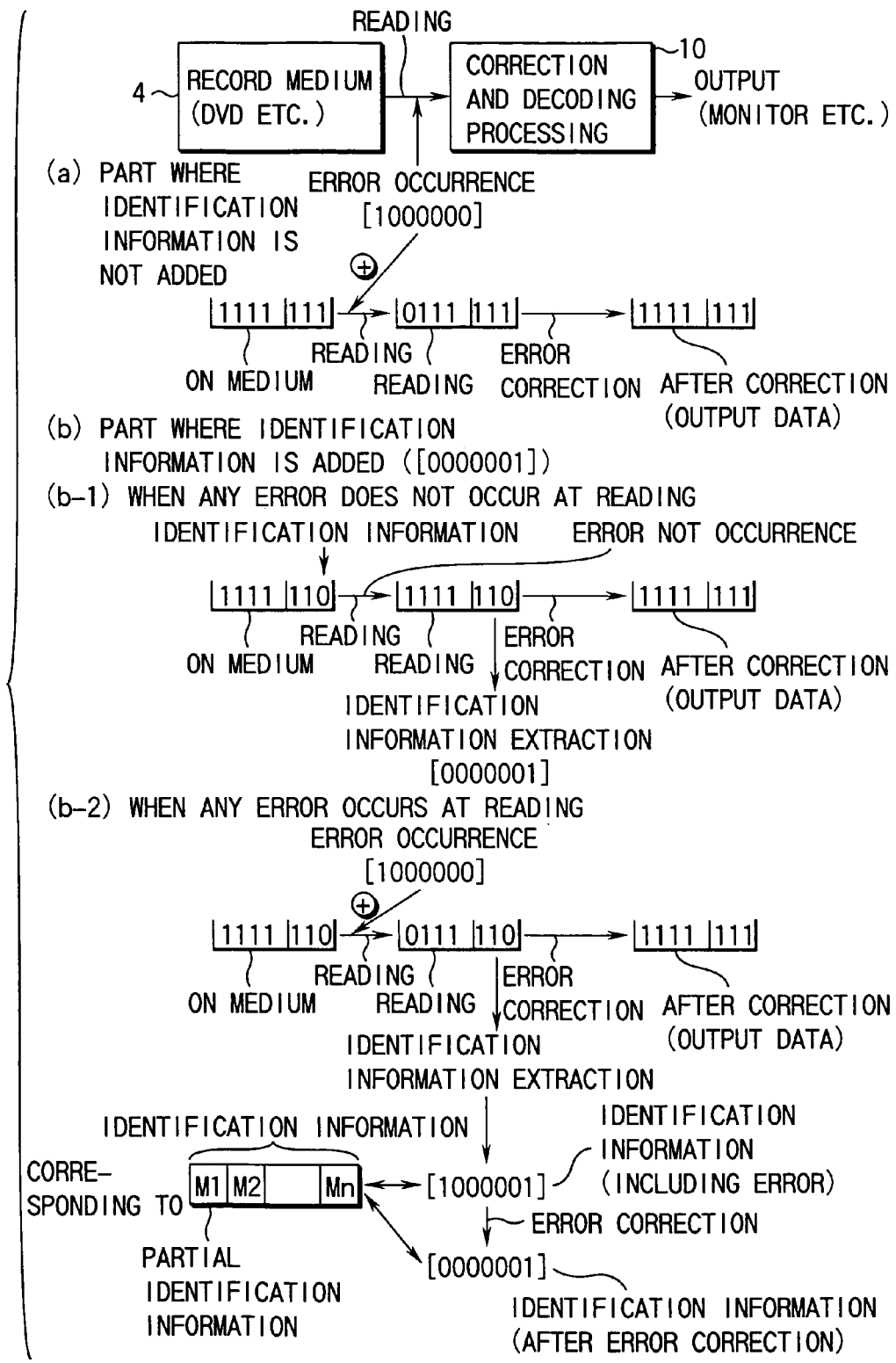
FIG. 3 is a figure to explain the principle of preventing an original data from copy with taking out the identification information M of the original data by using the error correction processing.

FIG. 3 is a figure to explain the principle of preventing copying of the original data when the identification information M is taken out of the original data by using the error correction processing. The error correction technology shown in FIG. 2 and FIG. 3 is extremely simplified for the convenience of explanation, and an actual error correction technology is more complex.

First, a data error occurs by bit inversion when data is read from the record medium or during a data transmission as shown in FIG. 2(a). It is a basic idea to perform error correction using redundancy of the data and thus present accurate data even if such a bit inversion occurs (FIG. 2(b)).

However, some bit inversions can occur even if redundant data for error correction is added to real contents data, and real contents data can be presented (for example, FIG. 2(c)). This processing is the error correction encoding processing in the error correction encoder 2 shown in FIG. 1. Therefore, when a data error gets into the data that has error correction encoding processing performed, data including the error is changed to data with no error by the error correction decoder before the error gets to the data presentation device.

The present invention uses this effect. One embodiment of the present invention records the information which is considered error data by the above-mentioned error correction technology on the record medium 4 as the identification information M. That is, the identification information superimposition circuit 3 according to one embodiment of the present invention superimposes the identification information M into the main body of data in a form considered to be error data by the data presentation device which presents the record medium 4. This superimposition embeds the identification information M into a part of data of the main body 8 of data at a low frequency rate such that satisfactory error correction can be performed by error correction decoding. Therefore, when the part where the identification information M is superimposed (as shown in FIG. 2(d)) is presented by a data presentation device such as a DVD player, it is presented by the error correction function the same as the initial data (digital data 7) before the identification information M was superimposed.

The presentation (data output) of original record medium 4 manufactured thus will be explained referring to FIG. 3. Here, two cases will be explained: a part where identification information M is embedded, and a part without embedded identification information.

The original record medium 4 is put into a data presentation device, such as a DVD-RAM drive and a player, and the device reads the data on the record medium and outputs the read data.

For a part of the read data where the identification information M is not superimposed, a bit is reversed (FIG. 3(a)) if there is a read error when data is read from the record medium. Thus, the reversed-bit error data is corrected, and the final output is the same as the real digital data 7 after the usual error correction decoding processing 10.

Next, consider the cases of an error occurring, and an error not occurring when data is read out from the record medium from a part where the identification information M is superimposed (FIG. 3(b)).

First, consider the case of no error occurring when reading data from the record medium (FIG. 3(b-1)).

The identification information M is embedded in the original data of the original record medium 4 beforehand as the data error. The identification information M is considered error data and is corrected by the error correction decoding processing 10 when this is read, and consequently the same data as the real digital data 7 is output. This output data is data corresponding to the real contents data. Therefore, the data presentation is accurately performed. However, this output data is not the same data as the original data of the original record medium 4. The reason is that the identification information M in the original data has been deleted by the error correction. Therefore, when this output data is copied, the copied data becomes data different from the original data. In subsequent data presentations, an unauthorized copy can be prevented by using the difference point thereof. When the identification information M is taken out and used, the identification information is extracted after reading from the record medium 4 and before performing the error correction.

Next, consider the case of the read error occurring when the part of the record medium where the identification information M is superimposed is read (FIG. 3(b-2)).

In this case, the output data is corrected just as for each above-mentioned case (FIG. 3(a) and FIG. 3(b-1)) and the same data as the digital data 7 is output. However, the data error should be included in the identification information extracted in this case. Then, if the error correction processing is performed to the identification information which includes this error, a first identification information M will be taken out. Though the identification information is short in the example of FIG. 3 for convenience of explanation, when the error correction processing is performed on the identification information, this identification information M becomes long enough as described above. Specifically, the error correction is performed as follows. Error correction and data presentation of the superimposed identification information data are performed by the error correction decoding. Here, when error data occurs in the identification information and read information/transmission line, further error correction is performed.

The identification information which indicates that it is an original record medium is superimposed on the data in the record medium as an error after error correction encoding according to the embodiment of the present invention above-mentioned. Therefore, it can be judged whether a record medium is an original record medium by extracting the identification information before processing by error correction decoding when reading.

Moreover, in the data presentation device, since the identification information is processed as an error after the error correction decoding processing completes, the real digital data is correctly decoded. Therefore, it becomes possible to clearly distinguish the record medium manufactured by copying from the original record medium because the identification information which indicates that it is original data is missing when the presentation data is copied onto another record medium.

Therefore, it is possible to surely distinguish the medium manufactured by copying from the original record medium since the copy management information is not transmitted on the transmission line with the presentation target data. In addition, unauthorized copying and unauthorized use of the data become very difficult since it is difficult for a general user to superimpose the identification information on data that has been error correction encoded.

In addition, since the identification information consists of the partial identification information, by distributing and superimposing this to the main body 8 of data, the concealment of the identification information and safety can be improved, and the data length can be longer. Therefore, it is possible to adopt a configuration in which error correction encoding is performed on the identification information extracted, for example, and thus the reliability of the identification information can be improved.

The record medium manufacturing device to manufacture the above-mentioned record medium can manufacture the record medium by providing the identification information superimposition circuit.

Second Embodiment

A mechanism to specify superimposed positions of the superimposed identification information M in the record medium 4 in the first embodiment will be explained in each of following embodiments.

In this embodiment, a record medium manufacturing device and a data presentation device which embed the superimposed position specification information in the main body of data in addition to the identification information M when manufacturing the record medium will be explained.

Figure 4:
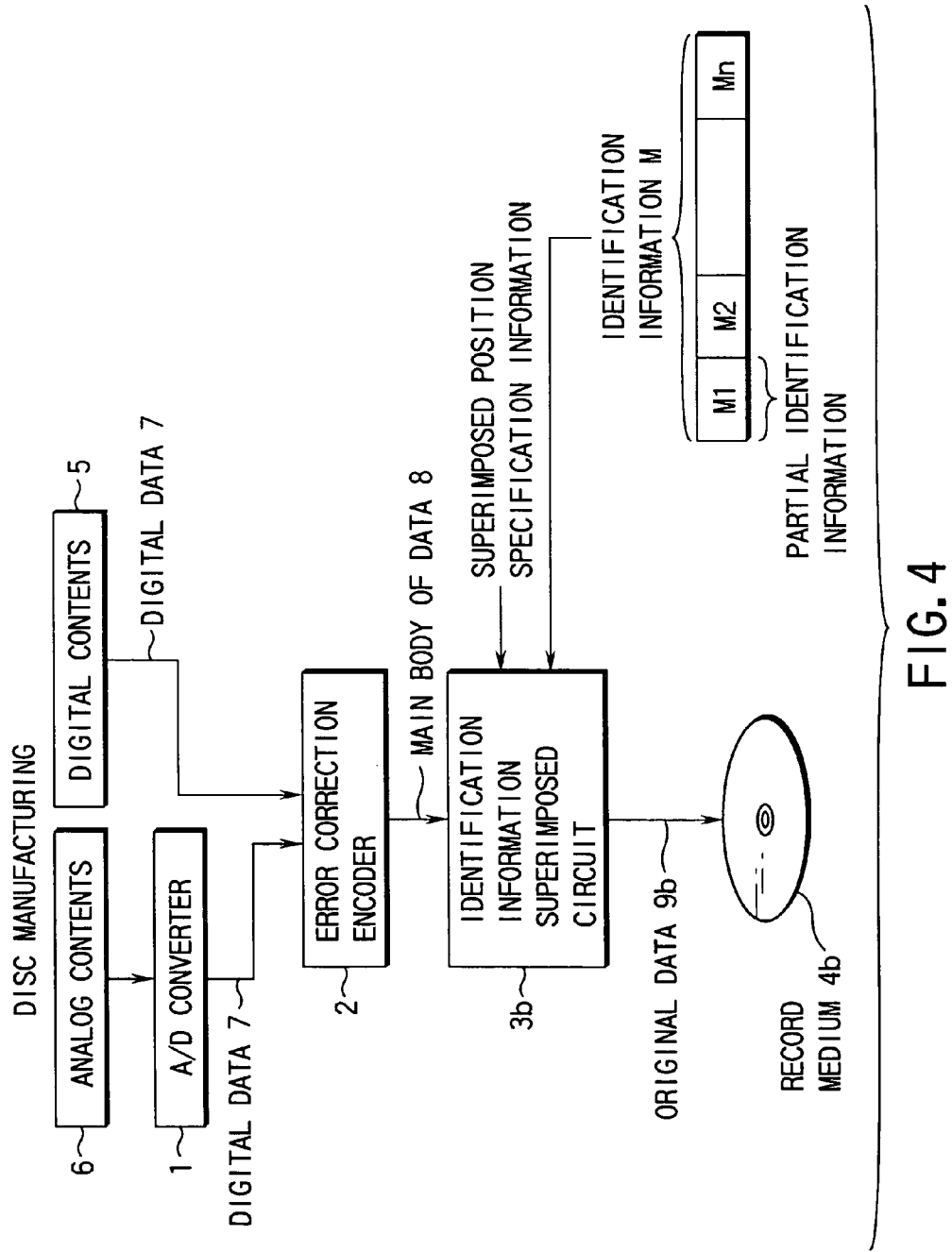
FIG. 4 is a block diagram which shows an example of a main configuration of the record medium manufacturing device according to the second embodiment of the present invention.

FIG. 4 is a block diagram which shows an example of a main configuration of the record medium manufacturing device according to the second embodiment of the present invention, and the same reference numeral is used to refer to the same part as FIG. 1 and an explanation of these parts will be omitted.

This record medium manufacturing device is constructed similar to the first embodiment except for being constructed with the identification information superimposition circuit 3b to superimpose the identification information M in the main body 8 of data instead of the identification information superimposition circuit 3, and except for generating original data 9b which adds the superimposed position specification information of the identification information to the main body of data along with identification information M. The superimposed position specification information is not superimposed to the main body of data but is added as additional data.

The record medium 4b is manufactured by storing the original data 9b produced thus.

Figure 5:
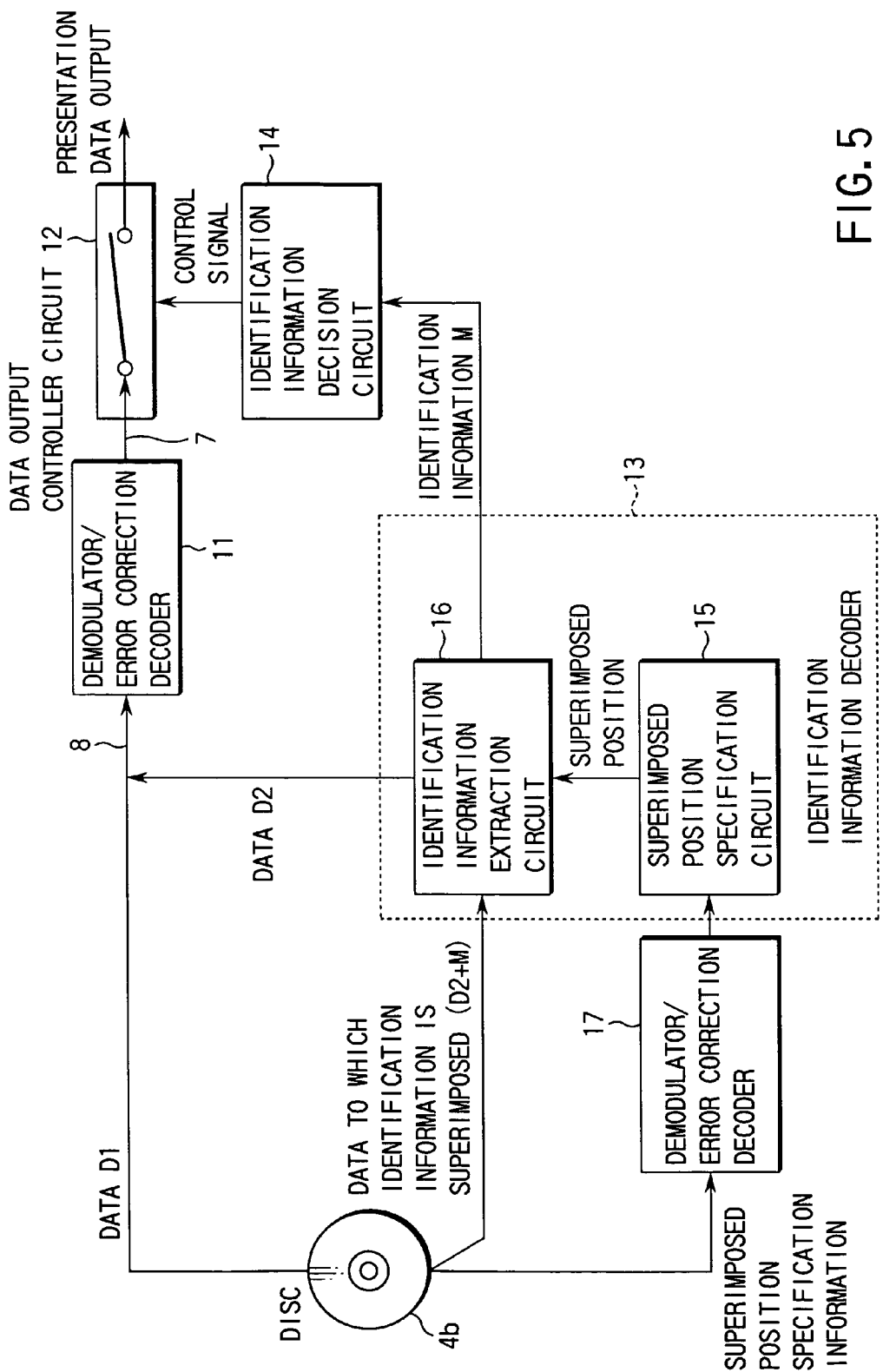
FIG. 5 is a block diagram which shows an example of a main configuration of the data presentation device of the embodiment.

FIG. 5 is a block diagram which shows an example of a main configuration for the data presentation device of this embodiment.

This data presentation device demodulates an error-corrects data D1 and D2 read from the record medium 4b by a disc read part (not shown) with the demodulation/error correction decoder 11, and presents and outputs through the data output controller 12.

When it is judged that the identification information output from the identification information decoder 13 is not right by the identification information judgment circuit 14, the data output controller 12 stops the presentation/output according to a control signal from the identification information judgment circuit 14.

The identification information decoder 13 has the superimposed position specification circuit 15 and the identification information extraction circuit 16.

The superimposed position specification circuit 15 decodes the superimposed position of the identification information in the data block based on the superimposed position specification information from the record medium 4b, and specifies the decoded superimposed position for the identification information extraction circuit 16. This superimposed position specification information is information which is read from the record medium 4b by the disc read part (not shown), and, in addition, demodulated and error-corrected by the demodulator/error correction decoder 17.

The identification information extraction circuit 16 reads data sections specified by the superimposed position from the record medium through the disc read part, extracts the identification information M (or, partial identifying information Mi), and sends it to the identification information judgment circuit 14. In addition, since the remainder of the data from which the identification information is extracted is a part of the main body 8 of data in FIG. 1, this is input to the demodulator/error correction decoder 11 as data D2.

Next, operation of the record medium manufacturing device and data presentation device constructed in accordance with the embodiment mentioned above will be explained.

First, a manufacturing process of the record medium 4 will be explained.

It is similar to the first embodiment until the digital data 7 from the analog contents 6 or the digital contents 5 in FIG. 4 become the main body 8 of data in which an error correction encoding is performed.

Next, the identification information M is superimposed at the position specified by the superimposed position specification information for the main body 8 of data by the identification information superimposition circuit 3b. The superimposed identification information M is similar to the first embodiment in that it is long enough to be able to perform the error correction and is divided into the partial identification information Mi. Moreover, to improve the reliability of the identification information M, a lot of the same identification information may be superimposed.

In addition, the superimposed position specification information is added to the main body 8 of data to which the identification information M is superimposed. This added superimposed position specification information is performed an error correction encoding as well as other contents digital data. The superimposed position specification information can be added before superimposition of the identification information M. The procedure of superimposing the identification information is performed when the disc is manufactured to correctly operate the identification information extraction described later.

A data block which consists of main body 8 of data to which the identification information M and the superimposed position specification information are superimposed is produced. In the data block, a lot of blocks may be stored in one record medium 4b, and or block may correspond to one record medium 4b. In any case, the data which is produced with the above-mentioned identification information superimposition circuit 3b and stored in the record medium 4b is the original data 9b.

Consequently, the original data 9b is stored in the medium and the record medium 4b is completed.

Next, the data presentation from this record medium 4b will be explained.

First, the record medium 4b which consists of a disc such as a DVD is put in a data presentation device as shown in FIG. 5. An encryption technology for unauthorized copy prevention has already been introduced in the DVD. The explanation of existing protection technology will be omitted in this embodiment. The contents are protected with two kinds of encoding keys in the DVD according to the prior art, and whether contents are encoded is not described in this embodiment. Naturally, this embodiment, can be adopted to these existing protection technologies.

The superimposed position specification information is read from the DVD disc at the first data reading position in each data block. After the demodulation and the error correction decoding processing are performed in the demodulator/error correction decoder 17, this superimposed position specification information is delivered to the superimposed position specification circuit 15.

The superimposed position specification circuit 15 obtains the position where the identification information M in the data is superimposed based on the received superimposed position specification information. This superimposed position is delivered to the identification information extraction circuit 16.

The main body part of the data which corresponds to normal contents (data D1) is read out, and error correction is performed and presentation data is output through the demodulator/error correction decoder 11 and the data output controller 12. In addition, the main body part of the data is read out, to which the identification information M was added, and the read data is delivered to the identification information extraction circuit 16 not to the demodulator/error correction decoder 11. This is. achieved because the identification information extraction circuit 16 acquires the embedded position of the identification information M from the embedded position specification circuit 15.

The corresponding identification information M is extracted from data (D2+M) which includes the identification information M (partial identification information Mi in reading once), and data D2 is sent to the demodulator/error correction decoder 11 and is presented and output like as the data D1.

The identification information extraction circuit 16 performs the error correction when the whole of the identification information M, which consists of the partial identification information units Mi, is obtained, and sends the result (identification information M) to the identification information judgment circuit 14. The identification information M is extracted at first of the data block reading in the chain in this embodiment as described later.

The identification information judgment circuit 14 verifies the validity of extracted identification information M. If the extracted identification information M indicates an unauthorized copy, a control signal is output to the data output controller 12 so that reading and the presentation of the data are stopped.

Even when the identification information M is right, the identification information M has disappeared from the presentation data because above-mentioned data D1 and D2 (D2 may be D2+M) are output as the presentation data through the demodulator/error correction decoder 11. Therefore, even if this presentation data is copied by any means, the identification information M cannot be extracted from the copy record medium to which the copy data is stored because it is not present on the copy record medium. Therefore, the present invention has the advantage that an unauthorized copy can surely be prevented.

Next, specific operation of an identification information decoder 13, including the superimposed position specification circuit 15, will be explained.

Figure 6:
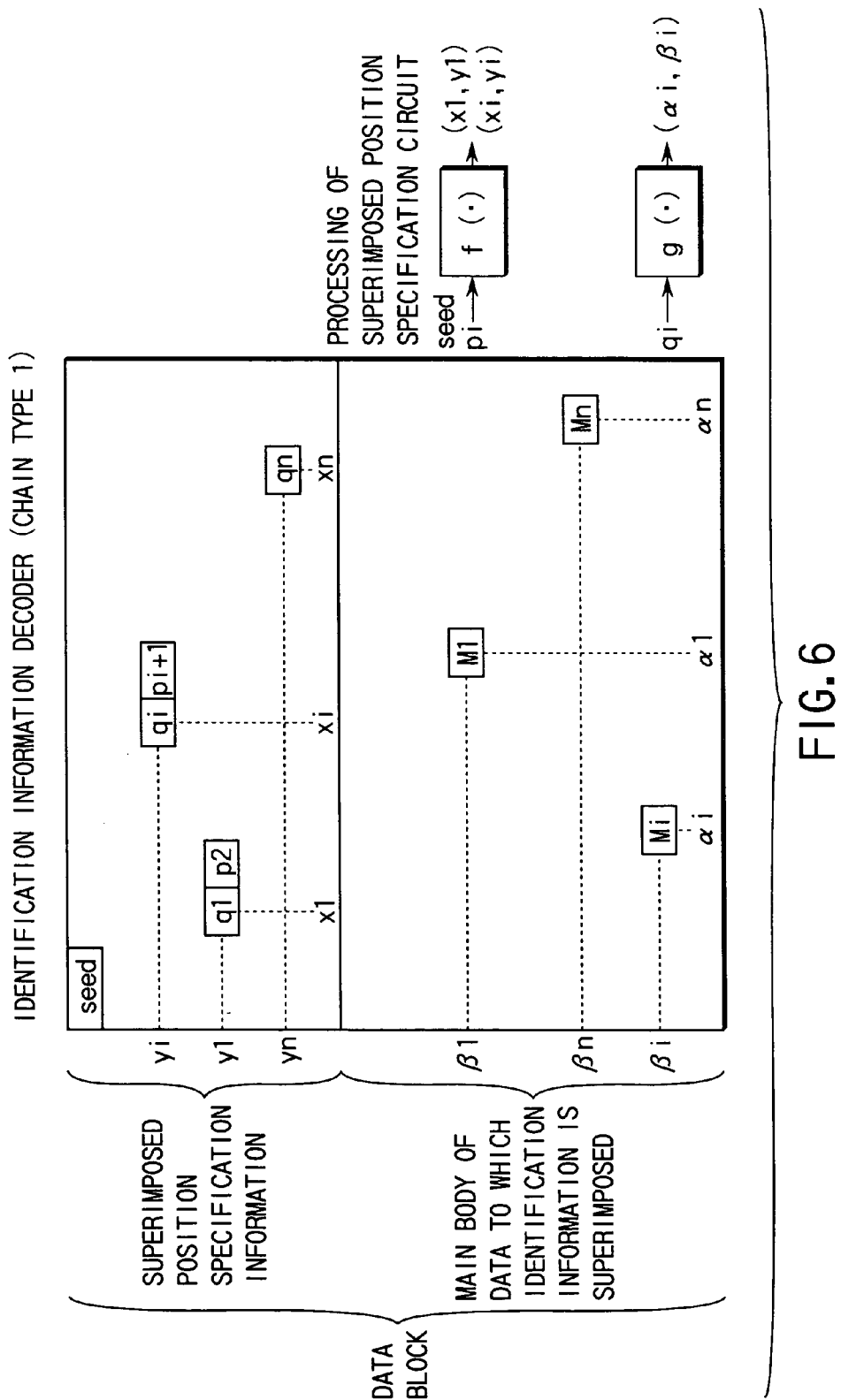
FIG. 6 is a figure to explain an operation of the data block and the identification information decoder.

FIG. 6 is a figure to explain an operation of the data block and the identification information decoder.

This data block has the superimposed position specification information of the identification information and the main body of data on which the identification information is superimposed. The superimposed position specification circuit 15 performs the conversion processing shown in FIG. 6.

First of all, an initial value (seed) for specifying the position is read from among the superimposed position specification information. And, the superimposed position specification circuit 15 calculates an initial value necessary for specifying the position by using a predetermined conversion function $f(\bullet)$, and thus obtains initial position information $f(seed)=(x1, y1)$. This obtained information indicates a position in the block where the identification information of the superimposed position specification information is recorded.

Next, data q1 recorded at the position shown by the initial position information (x1, y1) is chosen by the superimposed position specification circuit 15. Data q1 is converted by a predetermined conversion function $g(\bullet)$, yielding a position information $g(q1)=(\alpha 1, \beta 1)$ indicating where the identification information is superimposed. This obtained position information is delivered from the superimposed position specification circuit 15 to the identification information extraction circuit 16, and the partial identification information M1 superimposed at the specified position is extracted by the identification information extraction circuit 16.

Next, a position function $f(p2)=(x2, y2)$ calculates where a following superimposed position specification information is recorded, which location is obtained by the superimposed position specification circuit 15 using a predetermined distance from the position indicated by the above-mentioned initial position information (x1, y1) or a distance obtained by a predetermined conversion formula (distance is 1 in the right side in FIG. 6).

All superimposed position information is obtained by executing the above-mentioned operation repeatedly (sequentially). That is, a position information (xi,yi) where an i-th superimposed position specification information qi is recorded is obtained by $f(pi)=(xi,yi)$, and a position $g(qi)=(\alpha i, \beta i)$ where the identification information is superimposed is obtained by using the information qi which is recorded at the position. In addition, an operation of extracting the partial identification information Mi superimposed at the position is repeated sequentially until all (n pieces) partial identification informations are extracted.

In above-mentioned operation, when positions (xi, yi) and ($\alpha i$, $\beta i$) which have been chosen already by the conversion $f(\bullet)$ and $g(\bullet)$ are obtained respectively, to avoid the same value being chosen every time by the operation thereafter, data recorded at the position (further right adjacent position in FIG. 6) which is adjacent in a predetermined distance from the position where the data is recorded or at a distance obtained by a predetermined conversion formula is used to calculate the next value.

Since the record medium according to the embodiment of the present invention stores the superimposed position specification information in addition to having a similar configuration to the first embodiment as mentioned above, the identification information can be easily and certainly taken out.

Since the superimposed position of the partial identification information is stored in the superimposed position specification information obtained through the predetermined conversion, the concealment of the superimposed position is improved, and the identification information is safer. In addition, since the superimposed positions can be read sequentially, taking out the identification information is made easy.

Since the record medium manufacturing device of this embodiment comprises the identification information superimposition circuit 3b, the superimposed position specification information can be added easily to the superimposition of the identification information, and above-mentioned record medium 4b can be manufactured.

In addition, since the data presentation device of this embodiment comprises the identification information decoder 13 and the identification information judgment circuit 14, an advantage based on the above-mentioned record medium 4b can be achieved because a judgment can be made as to whether the data stored in the record medium is original data and whether it is an original record medium, and the judgment result can be output. Presenting an unauthorized copy by the data output controller 12 can be prevented by using this output judgment result In this embodiment, the identification information judgment circuit 14 judges whether a disc is the original record medium 4b which stores only the identification information M, and controls the data output. The present invention has a feature allowing the data corresponding to contents on the original record medium to be distinguished from the copy discs. Furthermore, by properly combining this function with CGNS or SCMS, etc., it is also possible to construct an unauthorized copy prevention system (various data copy generation management) that is ultrasafe and intelligent.

In the processing shown in FIG. 6, it is also possible to obtain the superimposed position of the partial identification information Mi by the conversion g(') assuming the data recorded at the adjacent position to be qi after the position of pi is obtained first by conversion f(•) by replacing the relationship of the superimposed position specification information pi and qi. For example, all of only the superimposed positions of the partial identification information M are previously obtained and deliver to the identification information extraction circuit 16 kept together, and the identification information extraction circuit 16 may take out the identification information M according to a proper timing.

Third Embodiment

In the second embodiment, it is comparatively easy to figure out the position where an initial value is recorded because an initial position information (x1, y1) is obtained by using an initial value (seed) which is recorded at the predetermined position. This embodiment is an embodiment in which an arithmetic to obtain initial position information becomes complicated, and the discovery of the position by the third party becomes more difficult.

Figure 7:
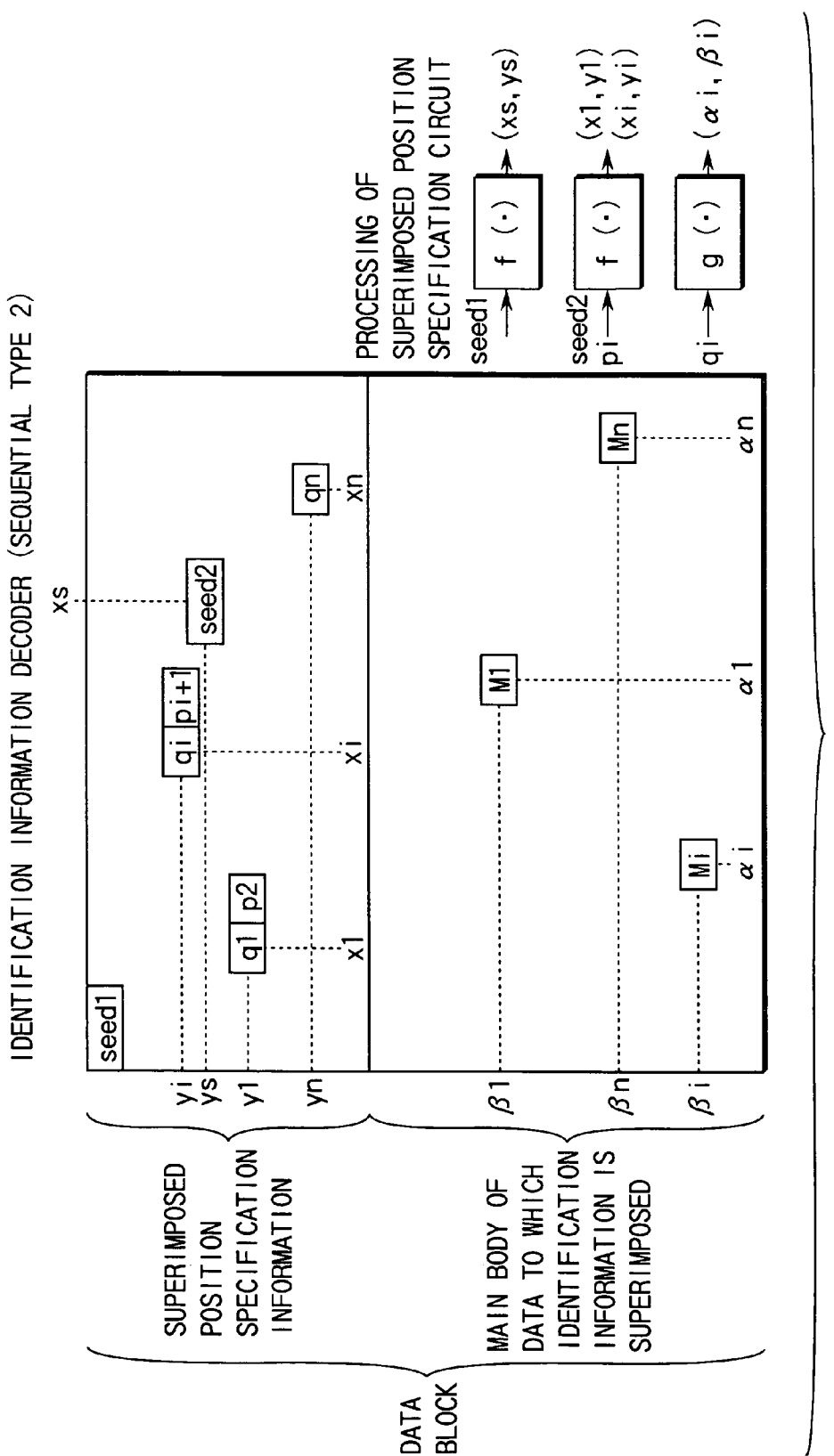
FIG. 7 is a figure to explain the configuration of the data block and an operation of the identification information decoder in the third embodiment' of the present invention.

FIG. 7 is a figure to explain an operation of the configuration of the data block and the identification information decoder in the third embodiment of the present invention.

That is, the record medium manufacturing device of this embodiment is constructed such as the record medium which becomes a data block shown in FIG. 7 is manufactured and data presentation device becomes executable a new conversion processing h(•). That is, the record medium manufacturing device of this embodiment manufactures the record medium which becomes a data block shown in FIG. 7, and the data presentation device is constructed that the new conversion processing h(•) becomes executable.

A superimposed position taking out processing of the identification information in this embodiment will be explained.

The disc manufacturing and the presentation procedure of the record medium in the parts other than the added conversion processing are similar to the second embodiment.

First of all, an initial value seed1 necessary for specifying the position with superimposed position specification circuit 16 is read from among, the superimposed position specification information, and is converted by the predetermined conversion h(•). A position (xs, ys) where the initial value seed2 used to a true position specification is recorded is obtained. Subsequently, the seed2 is converted by the conversion f(•), and an initial position information f(seed2)= (x1, y1) is obtained. An obtained information indicates a position in the area where the identification information superimposed position specification information is recorded. The following operations are similar to the second embodiment.

As described above, the record medium and the data presentation device according to the third embodiment of the present invention can improve the safety of specified information at the superimposed position and the concealment further more since the seed is converted by two stages besides a similar configuration to the second embodiment is provided.

Fourth Embodiment

In the fourth embodiment, a method different from the second and third embodiments for the mechanism to specify the superimposed position in the record medium 4 of the identification information M superimposed in the first embodiment will be explained.

Figure 8:
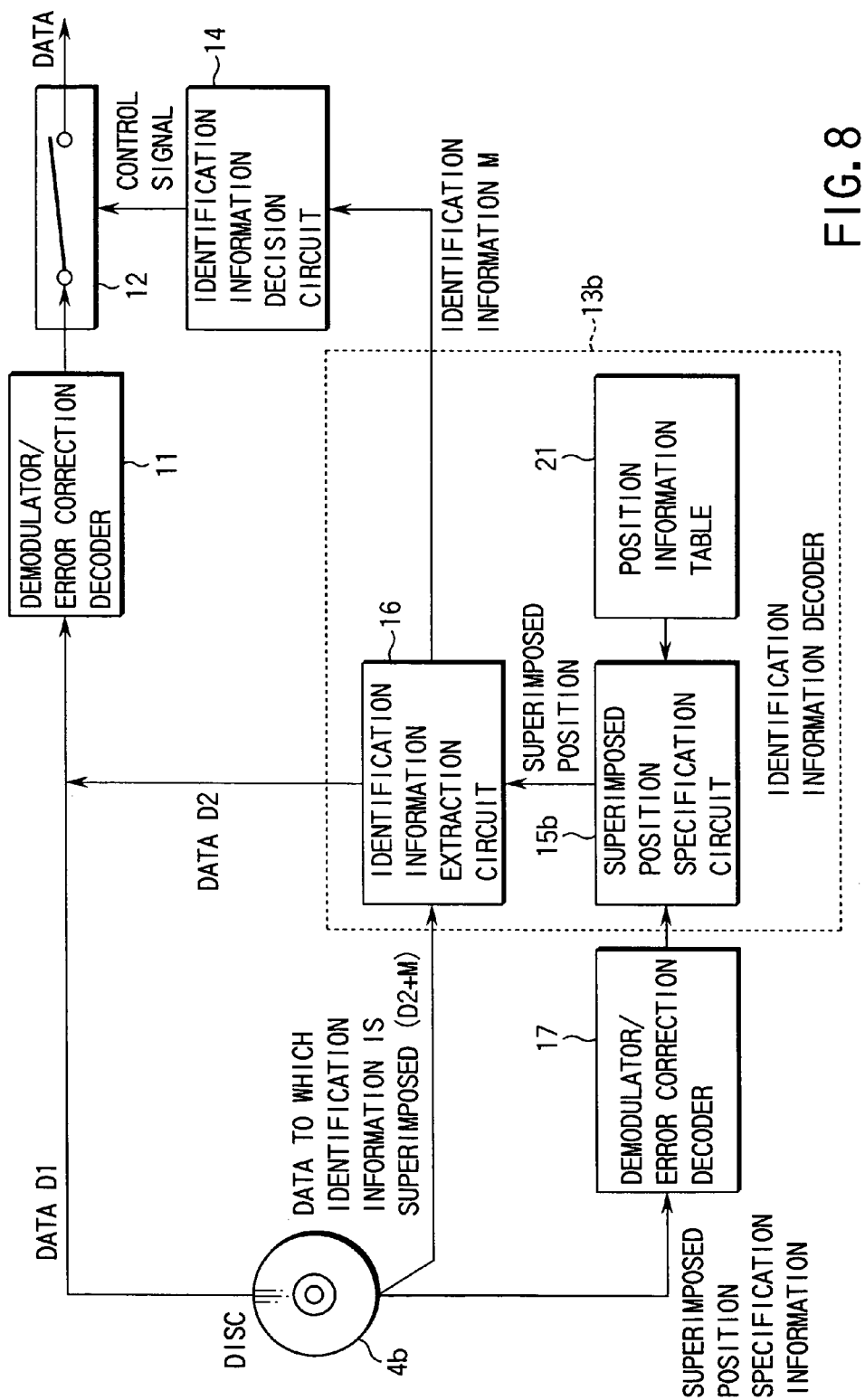
FIG. 8 is a block diagram which shows an example of a main configuration of the data presentation device of the fourth embodiment of the present invention.

FIG. 8 is a block diagram which shows an example of a main configuration of the data presentation device of the fourth embodiment of the present invention.

The data presentation device according to the, fourth embodiment is constructed similar to the second embodiment, except a position information table 21 is provided in the identification information decoder 13b and the superimposed position specification circuit 15b obtains not only the superimposed position of identification information from record medium 4b but also information on position information table 21.

Superimposed position information for each partial identification information MI, M2, . . . , Mn, which are the superimposed position specification information corresponding to indexes T1, T2, . . . , Tm, are stored in a position information table 21.

FIG. 9 is a figure to explain a method of acquiring the configuration of the information storage table and the superimposed position information on the partial identification information in this embodiment.

The record medium manufacturing device and operation of a data presentation device according to this embodiment will be explained.

First, the presentation procedure of the disc manufacturing and the record medium is similar to the second embodiment. A point different from the second embodiment is that only an index Ti is added and recorded as the superimposed position specification information, and not a superimposed position of each of the partial identification information. These indexes Ti, T2, . . . , Tm may correspond to each of a plurality of record media or correspond to each data block of one record medium (respectively).

When the disc is read by the data presentation device, this index Ti is read first, and the superimposed position pattern of the partial identification information corresponding to the index Ti is chosen from the position information table 21 in the superposed position specification circuit 15b. This superimposed position pattern is delivered from the superimposed position specification circuit 15b to the identification information extraction circuit 16, and the identification information extraction circuit 16 extracts the partial identification information Mj (j=1, 2, . . . , n) superimposed on each position.

The following processing is similar to the second embodiment.

As described above, in the record medium according to the fourth embodiment of the present invention, only the index is stored as the superimposed position specification information, a table corresponding to the index is provided in the data presentation device, and the superimposed position of the identification information can be acquired from the table based on the index. Therefore, one cannot easily know the superimposed position of the identification information by examining the record medium since the information recorded in the record medium is only an index.

Therefore, concealment of the identification information and safety are further improved in this embodiment.

Fifth Embodiment

The index Ti is directly stored as the superimposed position specification information in the fourth embodiment. A seed is stored as the superimposed position specification information in place of the index Ti, and the seed is converted and the index Ti is obtained in this embodiment.

Figure 10:
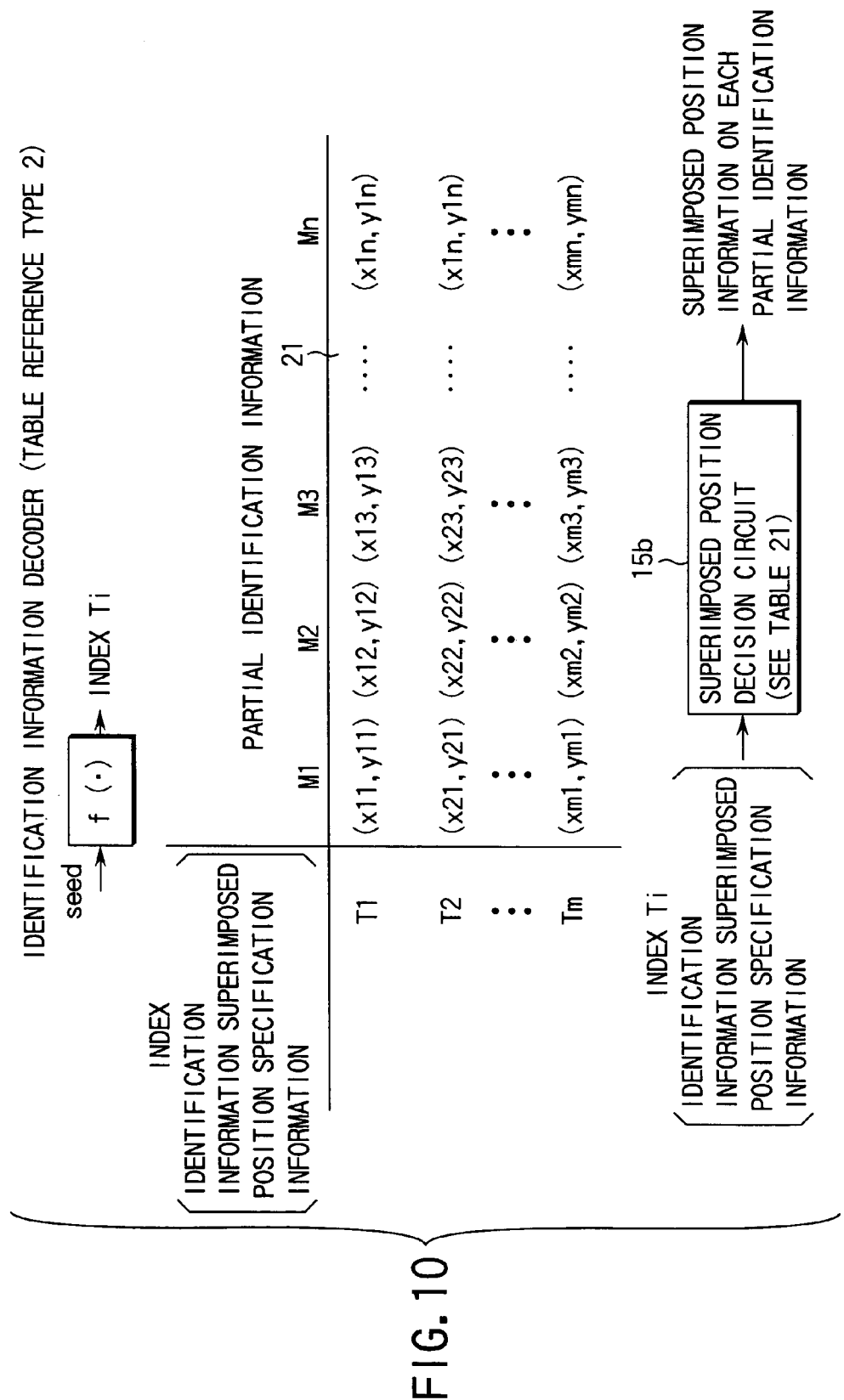
FIG. 10 is a figure to explain the configuration of the information storage table and a method of acquiring superimposed position information of partial identification information according to the fifth embodiment of the present invention.

FIG. 10 is a figure to explain a configuration of the information storage table and a method of acquiring the superimposed position information of the partial identification information in the fifth embodiment of the present invention.

The data presentation device of this embodiment is constructed similar to the fourth embodiment, but the process of performing the conversion f(•) on the seed and obtaining the index Ti is added to the superimposed position specification circuit 15b.

The record medium manufacturing device and operation of a data presentation device of this embodiment will be explained.

First, the seed is recorded in the record medium 4b as the identification information for the superimposed position specification information in place of the index Ti. When the disc is read by the presentation device, this information seed is read first, and is converted by the predetermined conversion f(•) in the superimposed position specification circuit 15b to obtain the index Ti into the information storage table 21.

The following processing is similar to the fourth embodiment.

As described above, since the record medium and the data presentation device according to this embodiment of the present invention obtain the index by converting the seed, and otherwise has a similar configuration to the fourth embodiment, safety and concealment of the specified information at the superimposed position is further improved.

In the above-mentioned fourth and fifth embodiments, though the information storage table is stored in the data presentation device, it is also possible to store the information storage table in the record medium. In this case, encoding is performed so that the information is made accessible by a key.

Sixth Embodiment

In this embodiment, means for preventing the presentation output of unauthorized copy data using a method different from the second to the fifth embodiments will be explained.

Figure 11:
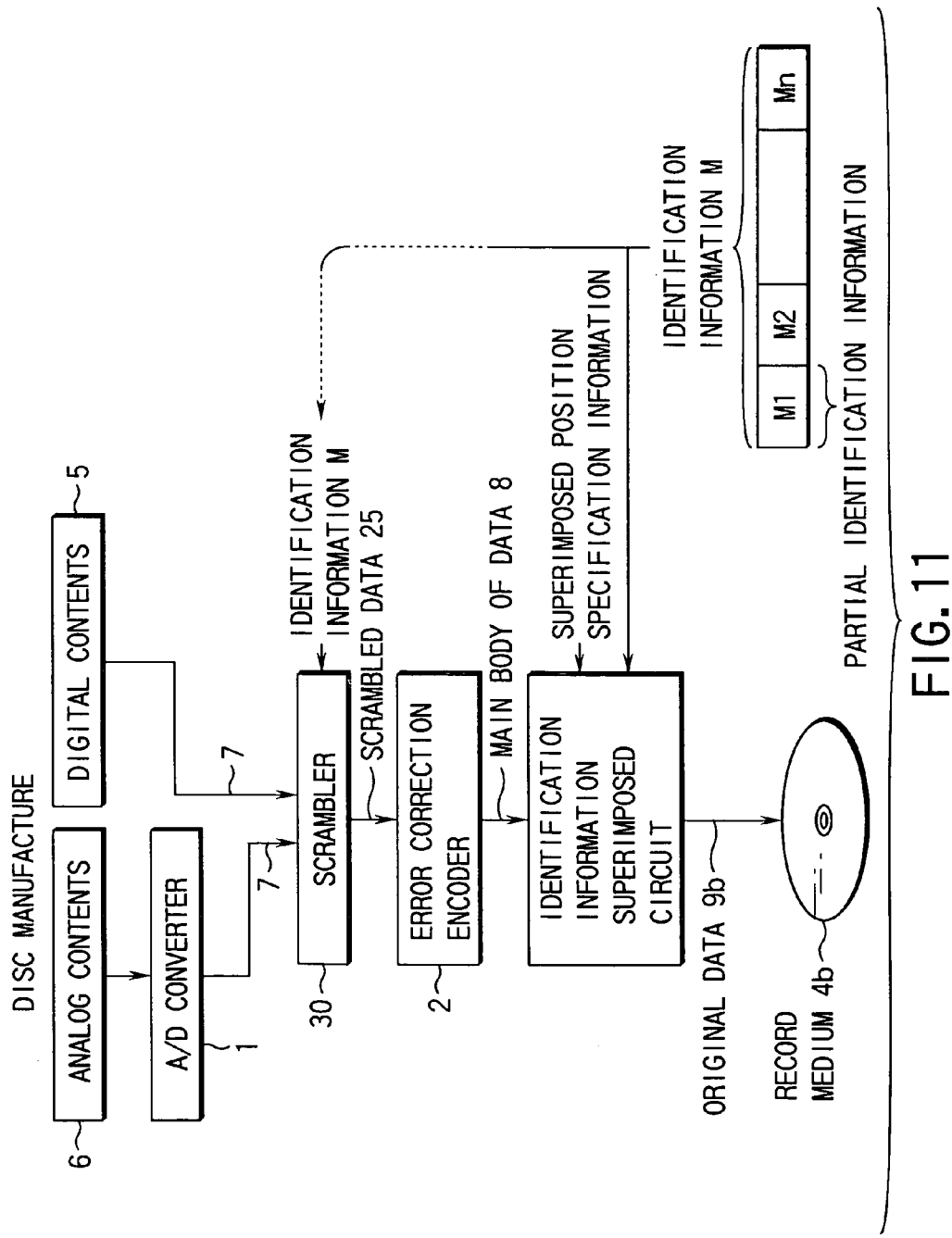
FIG. 11 is a block diagram which shows an example of a main configuration of the record medium manufacturing device of the sixth embodiment of the present invention.

FIG. 11 is a block diagram which shows an example of a main configuration of a record medium manufacturing device according to the sixth embodiment of the present invention, and the same reference numerals are attached to the same parts as in FIG. 4 and so the explanation of the parts will be omitted.

This record medium manufacturing device is constructed similar to the second embodiment except that a scrambler 30 is provided.

The scrambler 30 scrambles the digital data and the identification information M is made the key of the scramble scrambler 30 outputs the scramble data 25, and delivers it to the error correction encoder 2.

Figure 12:
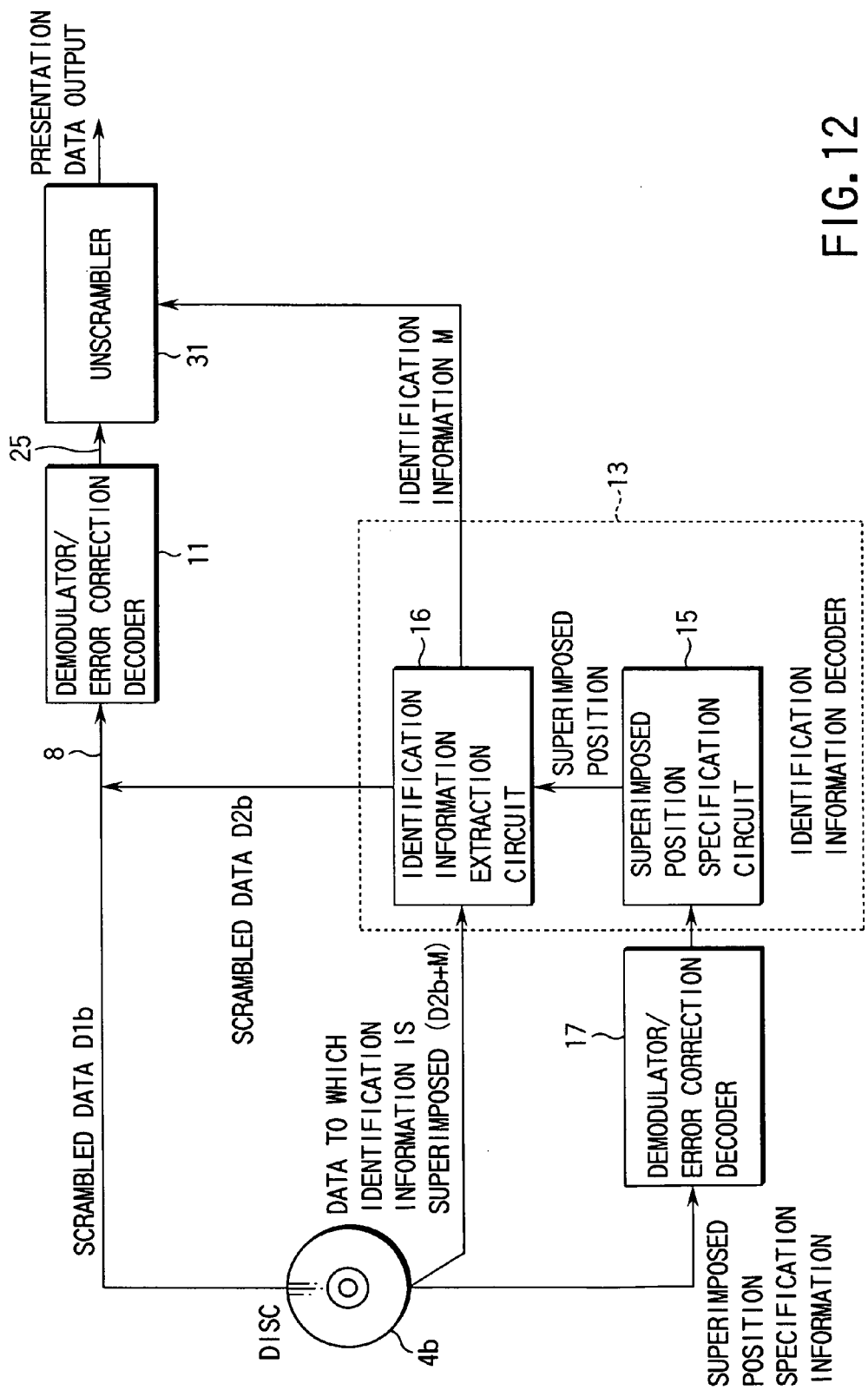
FIG. 12 is a block diagram which shows an example of a main configuration of the data presentation device of the embodiment.

FIG. 12 is a block diagram which shows an example of a main configuration of the data presentation device of this embodiment, and where the same reference numeral is attached to the same part as in FIG. 5, the explanation will be omitted.

This data presentation device is constructed similar to the second embodiment, except that an unscrambler 31 is provided in place of the data output controller 12 and the identification information judgment circuit 14.

The unscrambler 31 unscrambles scramble data 25 from demodulation/error correction decoder 11 the identification information M given from the identification information decoder 13. Unscrambler 31 outputs presentation data.

Operation of the record medium manufacturing device and the data presentation device of this embodiment, constructed as mentioned above, will be explained.

In the manufacturing of the record medium 4b shown in FIG. 11, similar processing is performed as in the second embodiment except the processing by the scrambler 30. In the scrambler 30, the digital data 7 is scrambled by using the identification information M.

In the presentation of record medium 4b shown in FIG. 12, the identification information M is read first by the identification information decoder 13, similar to what is done in the second embodiment.

This read identification information M is given to the unscrambler 31. The unscrambler 31 unscrambles the scramble data 25 from the demodulation/error correction decoder 11 using this identification information M as a key, and outputs the unscrambled data as a presentation data.

Here, an unscramble cannot be correctly performed and the correct data is not presented when the correct identification information cannot be decoded because the presentation disc is a copied disc.

As described above, the record medium according to this embodiment of the present invention scrambles the digital data 7 using the identification information as a key beforehand. Otherwise, it has a similar configuration to the second embodiment. Therefore, unscrambled presentation data cannot be presented if the unscrambling cannot be done because the key, the identification information, cannot be taken out. Thus, presentation of an unauthorized copy to the target data can be prevented.

The record medium manufacturing device to manufacture the record medium of this embodiment can manufacture the record medium in which the digital data 7 is scrambled by providing scrambler 30, and otherwise it has a similar configuration to the second embodiment.

In addition, the data presentation device of this embodiment provides the unscrambler 31, and otherwise it has a similar configuration to the second embodiment and unscrambles the scramble data according to the identification information. Therefore, the scramble can be released by the identification information only if data is read from the regular original record medium for the embodiment in which the digital data is scrambled. Therefore, prevention of unauthorized copying is improved.

Though an example using the second embodiment in which a method of scrambling the digital data 7 in which the identification information M is made a key is explained in this embodiment, an application of this embodiment is not limited to this example, but may be applied to any one of the first and third to fifth embodiments.

In this embodiment, a case where the digital data was scrambled was explained. The present invention is not limited to this embodiment, and, for example, data may be encoded instead of scrambled. In that case, the data is decoded instead of unscrambled, and the identification information M becomes a coding key and a decoding key.

The present invention is not limited to the above-mentioned embodiments, and can be variously transformed within the range of the scope of the present invention.

For example, a position to which the original data is stored in each embodiment is not especially specified. A DVD and CD have an area on which a control information for the contents data is recorded and an area on which the contents data is recorded. As an example of the former, there is an area where music track number etc. of the CD are described. The present invention may store original data which includes the identification information in any one or both of the above-mentioned areas.

Though, for example, each means is described in hardware, these can all be achieved by a software means. For example, the record medium manufacturing device and the data presentation device, etc. of the embodiment may comprise computer hardware resources, including a CPU and a memory, etc., which may implement each means of the identification information superimposition circuit and the identification information decoder, etc., for example by embodiment in a control program.

Therefore, techniques described in the embodiments can be distributed and stored in storage media of, for example, magnetic discs (floppy disc and hard disc drive, etc.), optical discs (CD-ROM and DVD, etc.), and the semiconductor memories, etc. as a program (software means) which is executable by the computer and transmitted by a communication medium. The program stored on the medium side includes an initialization program which constructs the software means (including not only the execution program but also the table and the data structure) executed by the computer. The computer which achieves this device reads the program recorded in the storage medium, constructs the software means according to the settings of the initialization program, and executes the processing mentioned above by controlling operation according to this software means.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A method of embedding identification information in a main body of data of a digital record medium, comprising:
   error correction encoding digital data to correct an error occurring during transmission of the main body of data;
   embedding, based on position information, the identification information in a part of the main body of data upon which the error correction encoding has been performed;
   embedding the position information, after embedding the identification information; and
   storing the main body of data, including the embedded identification information and the embedded position information, into the digital record medium,
   wherein said identification information has a plurality of partial identification information;
   an information to acquire the embedded position of said identification information has an initial value information, an embedded position information indicating an embedded position of said plurality of partial identification information, and a plurality of position information to acquire a position of said embedded position information;
   a first position information to acquire the position of said embedded position information is recorded at a position obtained by converting said initial value information by a predetermined function or a position shown by a position obtained as a result of the conversion; and
   a second or later position information is recorded in another position of the position obtained by converting a storage information of a position of a result when an information stored at another position of a side where said position information is not stored is further converted by said predetermined function in any positions obtained by a conversion result of said predetermined function, or a storage information at a position indicated to a position of a result of conversion one by one.

2. A method of embedding identification information in a main body of data of a digital record medium, comprising:
   error correction encoding digital data to correct an error occurring during transmission of the main body of data;
   embedding, based on position information, the identification information in a part of the main body of data upon which the error correction encoding has been performed;
   embedding the position information, after embedding the identification information; and
   storing the main body of data, including the embedded identification information and the embedded position information, into the digital record medium,
   wherein said identification information has a plurality of partial identification information;
   an information to acquire an embedded position of said identification information has an initial value information, an embedded position information indicating the embedded position of said plurality of partial identification information, and a plurality of position information to acquire a position of said embedded position information;
   an initial position information is recorded at a position obtained by converting said initial value information by a predetermined function or a position shown by a position obtained as a result of conversion by said predetermined conversion formula; and
   a position information after that is recorded at a position based on a data recorded by a predetermined distance at a position indicated by a position information obtained immediately before or a distance obtained by a predetermined conversion formula, or a position obtained by converting a position information obtained immediately before by a predetermined conversion formula.

3. A method of embedding identification information in a main body of data of a digital record medium, comprising:
   error correction encoding digital data to correct an error occurring during transmission of the main body of data;
   embedding, based on position information, the identification information in a part of the main body of data upon which the error correction encoding has been performed;
   embedding the position information, after embedding the identification information; and
   storing the main body of data, including the embedded identification information and the embedded position information, into the digital record medium,
   wherein said presentation target data is scrambled or encoded to make said identification information a key before an error correction encoding is performed.

* * * * *